United States Patent
Chen

(10) Patent No.: US 8,498,608 B2
(45) Date of Patent: Jul. 30, 2013

(54) METHOD OF NETWORK PAGING USER EQUIPMENT FOR ERROR RECOVERY IN WIRELESS COMMUNICATION SYSTEM AND RELATED COMMUNICATION DEVICE

(75) Inventor: Te-Ming Chen, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 17 days.

(21) Appl. No.: 13/008,860

(22) Filed: Jan. 18, 2011

(65) Prior Publication Data

US 2012/0021714 A1    Jan. 26, 2012

Related U.S. Application Data

(60) Provisional application No. 61/296,036, filed on Jan. 19, 2010.

(51) Int. Cl.
*H04M 11/04* (2006.01)

(52) U.S. Cl.
USPC ............. 455/404.1; 455/435.1; 455/458

(58) Field of Classification Search
USPC .................. 455/404.1, 458, 435.1
See application file for complete search history.

(56) References Cited

U.S. PATENT DOCUMENTS

| 7,076,248 B2 | 7/2006 | Amirijoo |
| 2010/0273511 A1* | 10/2010 | Chen et al. ............ 455/458 |

FOREIGN PATENT DOCUMENTS

| CN | 1554204 A | 12/2004 |
| GB | 2440576 A | 2/2008 |
| WO | 03043364 A1 | 5/2003 |
| WO | 2004028196 A1 | 4/2004 |

OTHER PUBLICATIONS

3GPP TS 24.301 V9.0.0 (Sep. 2009) Technical Specification 3rd Generation Partnership Project; Technical Specification Group Core Network and Terminals; Non-Access-Stratum (NAS) protocol for Evolved Packet System (EPS); Stage 3 (Release 9).
European patent application No. 11000398.5, European Search Report mailing date: May. 4, 2011.
Office action mailed on Apr. 12, 2011 for the European application No. 11000398.5, p. 1-9.

\* cited by examiner

*Primary Examiner* — Charles Shedrick
(74) *Attorney, Agent, or Firm* — Winston Hsu; Scott Margo

(57) ABSTRACT

A method of a network paging a user equipment for error recovery in a wireless communication system when a network failure occurs includes the network sending a paging message to the user equipment according to an IMSI or an IMEI of the user equipment registered to the network in the attach procedure before the network failure. When the user equipment does not have the IMSI, the network uses the IMEI of the user equipment for paging the user equipment for error recovery.

12 Claims, 3 Drawing Sheets

METHOD OF NETWORK PAGING USER EQUIPMENT FOR ERROR RECOVERY IN WIRELESS COMMUNICATION SYSTEM AND RELATED COMMUNICATION DEVICE

CROSS REFERENCE TO RELATED APPLICATIONS

This application claims the benefit of U.S. Provisional Application No. 61/296,036, filed on Jan. 19, 2010 and entitled "Method for paging a NO-IMSI UE in a wireless network", the contents of which are incorporated herein.

BACKGROUND OF THE INVENTION

1. Field of the Invention

The present invention relates to a method of a network paging a user equipment for error recovery in a wireless communication system and related communication device, and more particularly, to a method of a network paging a user equipment with proper identities for error recovery in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, a radio access network known as an evolved universal terrestrial radio access network (E-UTRAN) includes a plurality of evolved Node-Bs (eNBs) for communicating with a plurality of user equipments (UEs) and communicates with a core network (CN) including a mobility management entity (MME), serving gateway, etc for NAS (Non Access Stratum) control.

To receive services, e.g. evolved packet system (EPS) services, the UE needs to register with the network. During a registration procedure, e.g. attach procedure, the UE may first send an "ATTACH REQUEST" message to the core network (e.g. MME). The "ATTACH REQUEST" message includes an international mobile subscriber identity (IMSI), which is stored in a subscriber identity module (SIM) card inside the mobile device, e.g. UE. Because the IMSI uniquely addresses each subscriber, it is seen as critical information from a security point of view and its transmission clearly has to be avoided as much as possible. By spying on and monitoring the IMSI, eavesdropper may track a subscriber's location, movement, and activities. So the network allocates a temporary UE identity, for example a system architecture evolution (SAE) temporary mobile subscriber identity (S-TMSI), to the UE and renews it frequently in order to reduce the use of IMSI.

Besides, if a UE without a valid IMSI (e.g. the UE does not have a SIM card or the SIM card is invalid) would like to make an emergency call, the UE can still initiates a registration procedure for emergency bearer services. First, the UE sends an "ATTACH REQUEST" message to the network. In such case, the "ATTACH REQUEST" message is allowed to include an international mobile equipment identity (IMEI) instead of IMSI. An IMEI is a unique number which shall be allocated to each individual UE in the public land mobile network (PLMN) and shall be unconditionally implemented by the manufacturer. Then, the network also allocates a temporary UE identity, e.g. S-TMSI, to the UE and renews it frequently in order to reduce the use of IMEI.

In some abnormal cases, the network may still only use IMSI to initiate paging for error recovery, and/or informing UEs to register again/re-attach. For one example, due to a network failure, the S-TMSI is not available or becomes invalid, the network may use the registered IMSIs to initiate paging for EPS services with CN domain indicator set to packet switch (PS). For another example, due to a network failure, the tracking area identity (TAI) list is not available, the network may use the registered IMSIs to perform the paging within all tracking areas served by the network, e.g. the MME. In the above examples, only those UEs having IMSI will be paged, and those UEs having no IMSI will not be paged. In other words, UEs using IMEIs to attach to the network will not be paged. Consequently, UEs using IMEIs to attach to the network will not initiate another registration procedure after a network failure until those UEs need services from the network, causing unnecessary delay. However, generally those UEs using IMEIs to register to the network are for emergency purposes. For example, a car accident survivor using a UE without IMSI would like to make an emergency call so that the UE initiates the attach procedure with its IMEI to the network. If a network failure occurs, the network cannot page the UE only having its IMEI. As a result, the emergency call fails due to the network failure in the paging stage. This may put the survivor in great danger.

SUMMARY OF THE INVENTION

The present invention therefore provides a method of a network paging a user equipment for error recovery in a wireless communication system and related communication device.

According to one aspect of the present invention, a method of a network paging a user equipment for error recovery in a wireless communication system is provided. The method comprises the network sending a paging message to the user equipment according to information from a first specific procedure of the user equipment due to a network failure.

According to another aspect of the present invention, a method of a user equipment receiving a paging message from a network for error recovery in a wireless communication system. The method comprises the user equipment receiving the paging message from the network according to information from a first specific procedure of the user equipment due to a network failure.

According to another aspect of the present invention, a communication device of a network paging a user equipment for error recovery in a wireless communication system. The communication device comprises means for the network sending a paging message to the user equipment according to information from a first specific procedure of the user equipment due to a network failure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
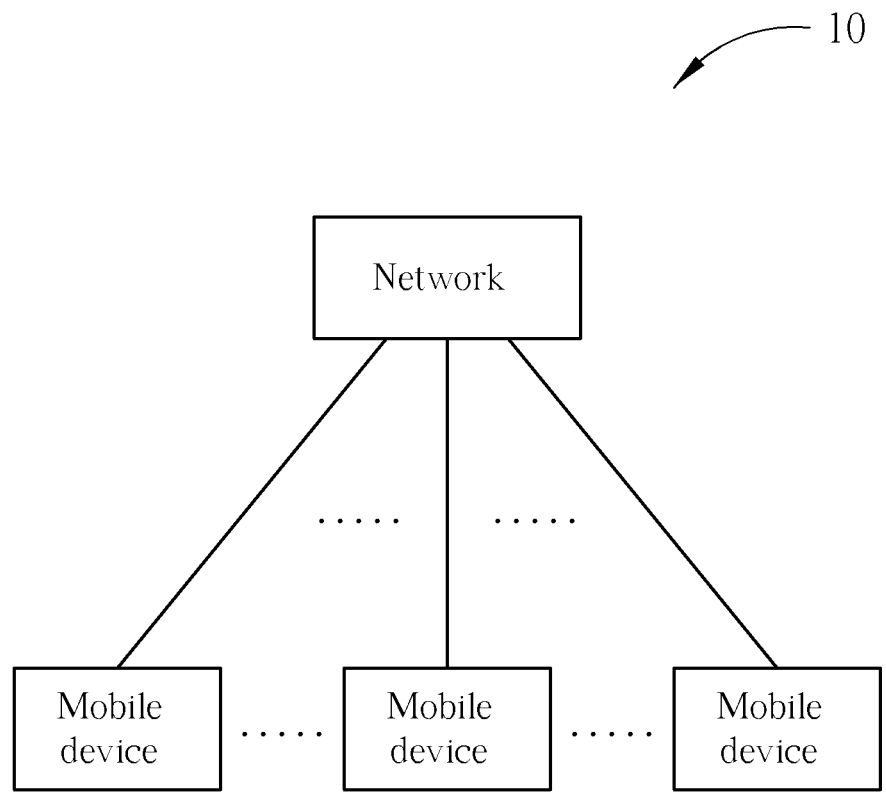
FIG. 1 is a schematic diagram of an exemplary wireless communication system of the present invention.

Please refer to FIG. 1, which illustrates a schematic diagram of an exemplary wireless communication system 10.

Briefly, the wireless communication system 10 is composed of a network and a plurality of mobile devices. The wireless communication system 10 can be a UMTS (Universal Mobile Telecommunications System), an LTE (long-term evolution), LTE-Advance system or any other similar network system. In the LTE system, the network can be referred as a EUTRAN (evolved-UTRAN) comprising a plurality of eNBs or a core network entity (e.g. Mobility Management Entity called MME), whereas the mobile devices are referred as to user equipments (UEs). The UEs can be devices such as mobile phones, computer systems, etc. This terminology will be used throughout the application for ease of reference, however, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
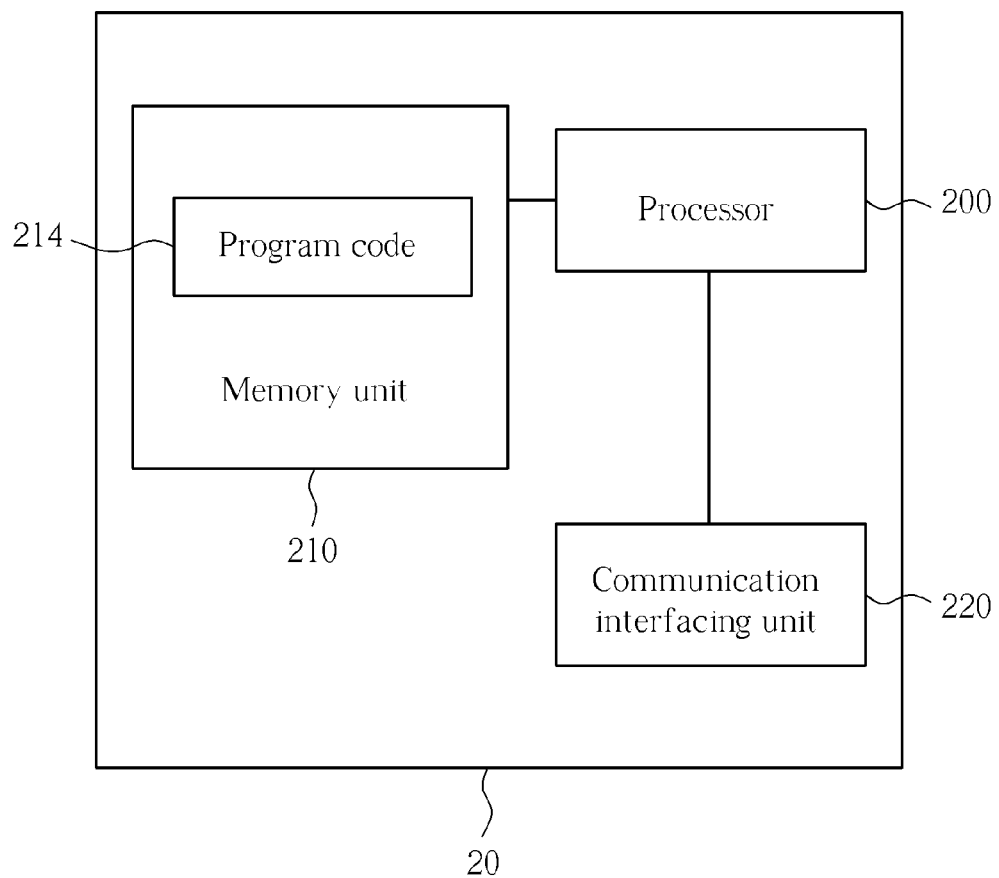
FIG. 2 is a schematic diagram of an exemplary communication device of the present invention.

Please refer to FIG. 2, which illustrates a schematic diagram of an exemplary communication device 20. The communication device 20 may be the mobile devices or the network shown in FIG. 1 and may include a processor 200 such as a microprocessor or ASIC, a memory unit 210 and a communication interfacing unit 220. The memory unit 210 may be any data storage device that can store program code 214 for access by the processor 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 may be preferably a radio transceiver and accordingly exchanges wireless signals according to processing results of the processor 200.

Figure 3:
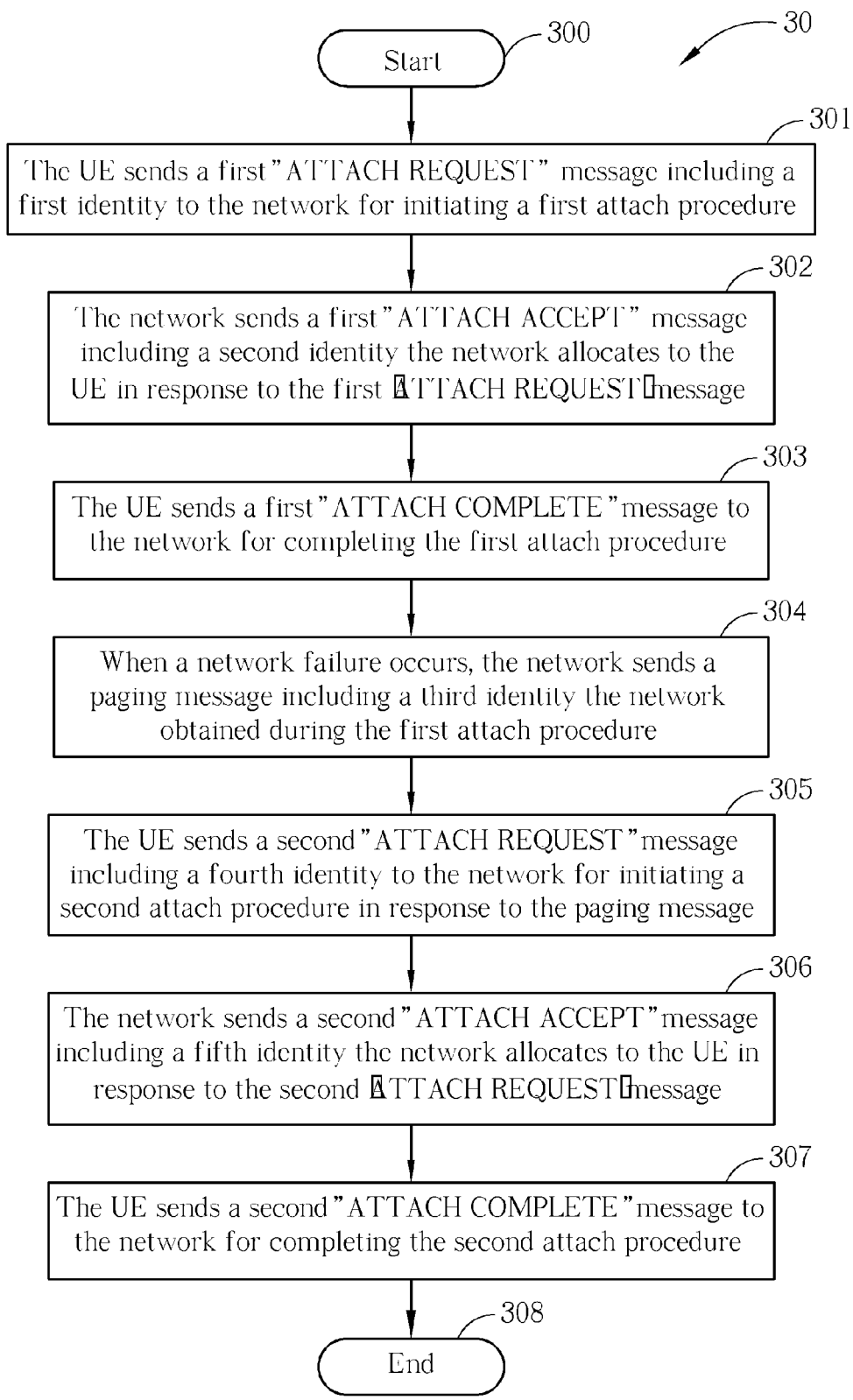
FIG. 3 is a flow chart of an exemplary process of the present invention.

Please refer to FIG. 3, which is a flow chart of an exemplary process 30 of the present invention. The process 30 is divided into two parts: a first part describe procedure UE(s) attaching to the network (steps 301-303) in a wireless communication system (registration procedure); the second part describe procedure the network used for paging UE(s) for EPS services for error recovery in the wireless communication system (steps 303-307). The process 30 may be compiled into the program code 214 and include the following steps:

Step 300: Start;
Step 301: The UE sends a first "ATTACH REQUEST" message including a first identity ID 1 to the network for initiating a first attach procedure;
Step 302: The network sends a first "ATTACH ACCEPT" message including a second identity ID2 the network allocates to the UE in response to the first "ATTACH REQUEST" message;
Step 303: The UE sends a first "ATTACH COMPLETE" message to the network for completing the first attach procedure;
Step 304: When a network failure occurs, the network sends a paging message including a third identity ID3 the network obtained during the first attach procedure;
Step 305: The UE sends a second "ATTACH REQUEST" message including a fourth identity ID4 to the network for initiating a second attach procedure in response to the paging message;
Step 306: The network sends a second "ATTACH ACCEPT" message including a fifth identity ID5 the network allocates to the UE in response to the second "ATTACH REQUEST" message;
Step 307: The UE sends a second "ATTACH COMPLETE" message to the network for completing the second attach procedure;
Step 308: End.

In step 301, in the first "ATTACH REQUEST" message sent from the UE, the first identity ID1 may be IMSI or IMEI of the UE. More particularly, the first identity ID1 should be IMSI if the UE has the IMSI, and should be IMEI if the UE does not have the IMSI.

In step 302, the network allocates the second identity ID2 to the UE according to the identity ID1 obtained from the first "ATTACH REQUEST" message. The second identity ID2 may be a temporary identity such as a temporary mobile subscriber identity (TMSI), a S-TMSI, a global unique temporary identity (GUTI), or a MME-TMSI (M-TMSI).

In step 303, the UE sends the first "ATTACH COMPLETE" message to inform the network that the UE has received the allocated identity ID2 and the UE may use the allocated identity ID2 to acquire the EPS services provided by the network.

In step 304, the network sends the paging message to inform the UE that the UE has to initiate a second attach procedure due to a network failure. For the UE to know the paging message is dedicated to itself, the third identity ID3 included the paging message should be recognizable to the UE, which means the third identity ID3 can be IMSI or IMEI of the UE, depending on which identity the UE uses to attach to the network. Besides, the third identity ID3 can also be the second identity ID2 allocated by the network for more flexibility.

In step 305, in the second "ATTACH REQUEST" message sent from the UE, the fourth identity ID4 may be IMSI or IMEI of the UE. More particularly, the fourth identity ID4 should be IMSI if the UE has the IMSI, and the fourth identity ID4 should be IMEI if the UE does not have the IMSI. Besides, the fourth identity ID4 can also be the second identity ID2 allocated by the network from the first attach procedure for more flexibility.

In step 306, the network allocates the fifth identity ID5 to the UE according to the identity ID4 obtained from the second "ATTACH REQUEST" message. The fifth identity ID5 may be a temporary identity such as S-TMSI, GUTI, M-TMSI, or TMSI.

In step 307, the UE sends the second "ATTACH COMPLETE" message to inform the network that the UE has received the allocated identity ID5 and the UE may use the allocated identity ID5 to acquire the EPS services provided by the network.

Additionally, it is noticeable that in steps 305-307, the first and the second attach procedure can be initiated for emergency purposes or non-emergency purposes, and the second attach procedure can be replaced with any other specific/dedicated procedure. For example, the second attach procedure can be replaced with a dedicated procedure to inform the network that the UE has received the paging message including the IMEI or IMSI. Step 304 may be only initiated when the following conditions occur: (1) if the S-TMSI is not available due to a network failure; (2) if the TAI list is not available due to a network failure. When condition (2) occurs, in step 304, the network may use all the identities obtained in the first attach procedure to perform the paging within all the invalid tracking areas served by the network. In other words, when the TAI list is not available due to a network failure, the network of the present invention sends paging messages with registered IMSIs to those UEs having the IMSIs within all the invalid tracking areas served by the network, and sends paging messages with registered IMEIs to those UEs having no IMSIs (only having IMEIs) within all the invalid tracking areas served by network.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processor 200 processes the program code 214 related to the abovementioned processes, the processed results of which can handle validity of paging for the communication device 20.

To sum up, in the abovementioned examples, when the network initiates paging a UE for EPS services if the S-TMSI is not available due to a network failure, the network is not limited to use only IMSI of the UE, but may use the IMSI or IMEI of the UE. And when the network performs the paging within all the tracking areas served by the MME if the TAI list is not available due to a network failure, the network is not limited to use only IMSI of the UEs within all the tracking areas, but may use the IMSIs or IMEIs of the UEs within all the tracking areas. In this way, no UE will be missed during the paging stage, especially for those UEs only having IMEIs when they request emergency services.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of a network paging a user equipment for error recovery in a wireless communication system, the method comprises:
   the network sending a paging message to the user equipment according to information from a first specific procedure of the user equipment due to a network failure, wherein the first specific procedure is an attach procedure for an emergency purpose initiated by the user equipment before the network failure and the information includes an international mobile equipment identity (IMEI) of the user equipment.

2. The method of claim 1, wherein the paging message includes the IMEI.

3. The method of claim 1, wherein the user equipment does not have an international mobile subscriber identity (IMSI) or a valid IMSI.

4. The method of claim 1, further comprising:
   the network allocating a temporal identity to the user equipment in response to a second specific procedure initialized by the user equipment after the paging message.

5. The method of claim 4, wherein the second specific procedure is an attach procedure, and the attach procedure comprises:
   the network sending an attach accept message to the user equipment in response to an attach request message sending from the user equipment;
   wherein the attach request message includes an IMEI or a temporary identity allocated by the network to the user equipment in the first specific procedure;
   wherein the network includes an S-TMSI, a global unique temporary identity (GUTI), a mobile management entity temporary mobile subscriber identity (M-TMSI), or a temporary mobile subscriber identity (TMSI) in the attach accept message.

6. A method of a user equipment receiving a paging message from a network for error recovery in a wireless communication system, the method comprises:
   the user equipment receiving the paging message from the network according to information from a first specific procedure of the user equipment due to a network failure, wherein the first specific procedure is an attach procedure for an emergency purpose initiated by the user equipment before the network failure and the information includes an international mobile equipment identity (IMEI) of the user equipment.

7. The method of claim 6, wherein the paging message includes the IMEI.

8. The method of claim 6, wherein the user equipment does not have an international mobile subscriber identity (IMSI) or a valid IMSI.

9. The method of claim 6, further comprising:
   the user equipment initiating a second specific procedure for the network allocating a temporal identity to the user equipment after the paging message.

10. The method of claim 9, wherein the second specific procedure is an attach procedure, and the attach procedure comprises:
    the user equipment sending an attach request message to the network; and
    the user equipment receiving an attach accept message from the network in response to the attach request message;
    wherein the user equipment includes an IMEI or a temporary identity allocated by the network to the user equipment in the first specific procedure in the attach request message;
    wherein the attach accept message includes an S-TMSI, a global unique temporary identity (GUTI), a mobile management entity temporary mobile subscriber identity (M-TMSI), or a temporary mobile subscriber identity (TMSI).

11. A communication device of a network paging a user equipment for error recovery in a wireless communication system, the communication device comprises:
    means for the network sending a paging message to the user equipment according to information from a first specific procedure of the user equipment due to a network failure, wherein the first specific procedure is an attach procedure for an emergency purpose initiated by the user equipment before the network failure and the information includes an international mobile equipment identity (IMEI) of the user equipment.

12. The communication device of claim 11, wherein the paging message includes the IMEI.

* * * * *